(12) United States Patent
Tian

(10) Patent No.: US 7,291,876 B1
(45) Date of Patent: Nov. 6, 2007

(54) DIFFUSION BIAS CONTROL FOR IMPROVING SENSITIVITY OF CMOS ACTIVE PIXEL SENSORS

(75) Inventor: Hui Tian, Cupertino, CA (US)

(73) Assignee: MagnaChip Semiconductor, Ltd., Chungcheongbuk-Do (KR)

( * ) Notice: Subject to any disclaimer, the term of this patent is extended or adjusted under 35 U.S.C. 154(b) by 113 days.

(21) Appl. No.: 11/067,039

(22) Filed: Feb. 25, 2005

(51) Int. Cl.
*H01L 31/062* (2006.01)

(52) U.S. Cl. .................................. 257/291; 257/292
(58) Field of Classification Search ............. 257/291, 257/292
See application file for complete search history.

*Primary Examiner*—Long Pham
(74) *Attorney, Agent, or Firm*—Greenberg Traurig, LLP

(57) ABSTRACT

In CMOS active pixels there are reverse biased non-photo-detector N type diffusions that attract carriers. These carriers, if not collected by the photo-detector, are effectively lost, and thus the overall sensitivity of the pixel is reduced. This invention provides a method to minimize the bias on non-photo-detector diffusions to minimize the number of wasted carriers and thus improve sensitivity.

9 Claims, 3 Drawing Sheets

DIFFUSION BIAS CONTROL FOR IMPROVING SENSITIVITY OF CMOS ACTIVE PIXEL SENSORS

BACKGROUND

1. Field

This invention relates to the field of digital image processing, particularly the operation of CMOS active pixel sensors for increased sensitivity.

2. Related Art

CMOS active pixel sensors have become a viable alternative to CCD imagers for many digital imaging applications such as digital movie and still cameras, camera cell phones and security cameras. The CMOS imager technology is advantageous for many reasons including, but not limited, low power requirements and low cost and ease of manufacture based on the fact that CMOS imagers can be produced on almost any standard CMOS fabrication line. However, current CMOS image sensors do have drawbacks that effect quality and performance. In particular, the sensitivity of CMOS active pixel sensors can be negatively impacted by the typical configuration and operation of the pixels.

A typical CMOS active pixel sensor, as depicted schematically in FIG. 1a, comprises of a photo-detector, 102, a RESET transistor, 104, a source follower transistor, 106, an access transistor, 108, and optionally an additional transfer gate. When photons strike a CMOS active pixel sensor electron-hole pairs are generated in the silicon. The number of charge carriers generated is directly proportional to the level of the incident light. The bulk of the charge carriers then diffuse to the photo-detector. However, there are a significant number of charge carriers that diffuse to other sites. The charge carriers collected by the photo-detector can then be read out for each pixel in a sensor array and a composite of the light level detected at each pixel can be used to represent an image. Charge carriers that diffuse to other sites are lost and thus have the effect of lowering the overall sensitivity of the sensor. Among these other sites are the reverse biased, highly doped N type diffusions of the in-pixel source/drain of the transistors. Electrons that are lost the in-pixel transistors not only represent the loss of signal affecting sensitivity, but they can also affect the end image quality via leakage and noise they can cause.

To improve CMOS imager sensitivity in certain lighting and imaging situations, there is a need to improve loss of CMOS active pixel sensor sensitivity due to the diffusion of charge carriers away from the in pixel photo-detectors.

Typically, in the structure and operation of CMOS active pixel sensors, the source or drain of the RESET transistor, 104, and the source follower transistor, otherwise known as the reference line in the art, are held at some non-ground voltage, $V_{dd}$, 110. During the charge collection, or integration, period both transistors' sources and drains are sitting at $V_{dd}$. This voltage causes a non-zero electric field at the P-N junction that can attract the generated charge carriers.

SUMMARY

A method to control charge carrier diffusion to sites other than the photo-detector in a CMOS active pixel sensor is disclosed. By disconnecting or rerouting the electrical connection between the source/drain of the RESET and source follower transistors in a CMOS active pixel, the voltage at those two points can be held at some low voltage or ground. By removing a high voltage the from the source/drain of the transistors, the junction electric field can be maintained to be zero or near zero so as to minimize the diffusion of charge carriers away from the photo-detector of the pixel. In this way, more of the generated charge carriers can be collected by the photo-detector, effectively increasing the amount signal available. The increase of available signal increases the overall sensitivity of the CMOS active pixel sensor.

DETAILED DESCRIPTION

Figure 1A:
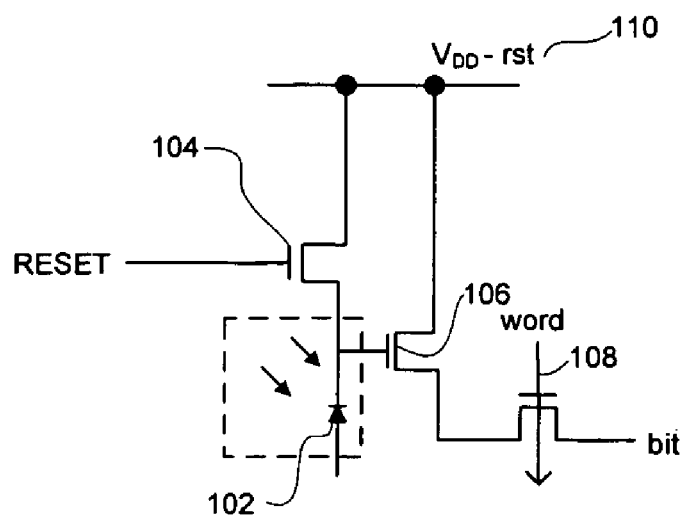
FIG. 1a is a diagram illustrating the configuration of a typical prior art CMOS active pixel.
Figure 1B:
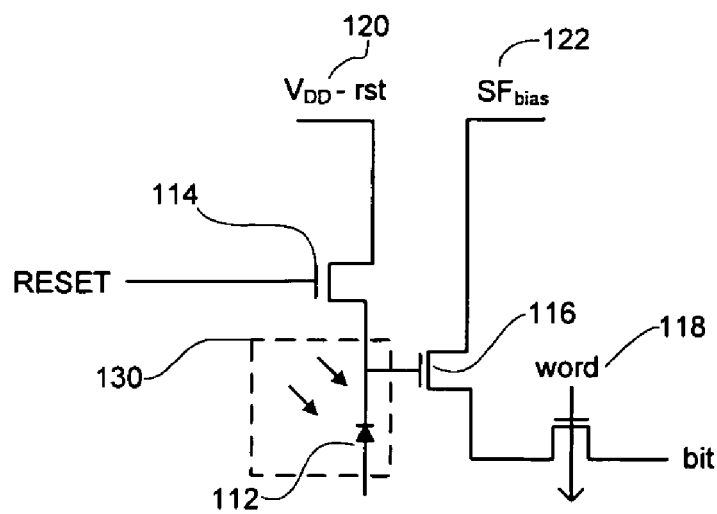
FIG. 1b is a diagram illustrating the configuration of a CMOS active pixel according one embodiment of the current invention.

FIG. 1b shows one possible configuration of a CMOS active pixel sensor according to one embodiment of the current invention. It should be noted that means outside of the pixel are needed to provide the $V_{dd}$-rst and $SF_{bias}$. It is contemplated that there are many methods and devices known to those skilled in the art to implement the necessary external signals, and any variation therein would not alter the spirit or intent of the current invention. Region 130 represents the active area, or light collecting, region of the pixel. Region 130 typically contains or partially contains the light sensitive photo-detector 112, typically a photo-diode. In the current invention the source/drain of the RESET transistor 114 and the source/drain of the source follower transistor 116 are not electrically coupled. This decoupling makes it possible to apply two separate voltages to the two source/drains; here $V_{dd}$-rst and $SF_{bias}$. With separate voltages available, it is possible to hold $V_{dd}$-rst high always but hold $SF_{bias}$ low, preferably at ground, during integration or charge collection period which minimizes the electric field at the non-photo-detector N-type diffusion locations thus reducing the number of charge carriers attracted to those N-type diffusions and thus reduce the number the of wasted charge carriers.

Figure 2:
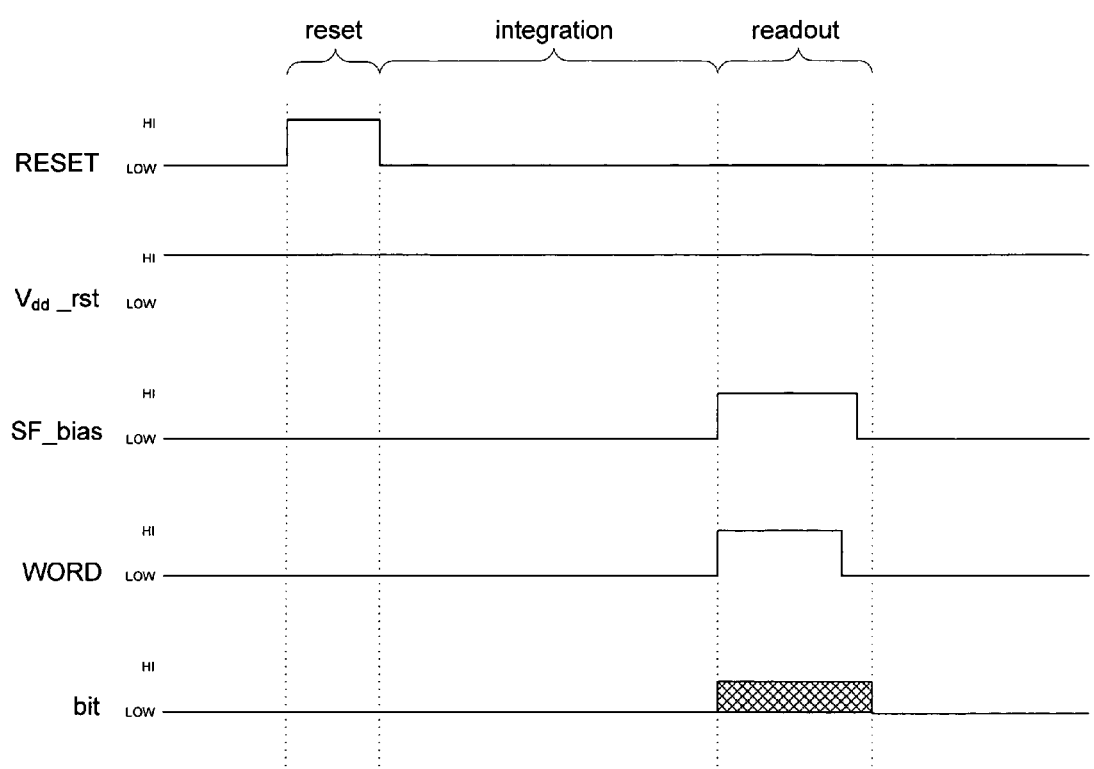
FIG. 2 is a timing diagram of the operation of a CMOS active pixel according to one embodiment of the current invention.

FIG. 2 is a timing diagram of the voltages indicated in FIG. 1b according to the operation of a CMOS active pixel in one embodiment of the current invention. In the diagram, time runs from left to right and the vertical component of each separate line represents a high or low voltage according to how each signal line is biased. As indicated, the voltages are initially set so that RESET, $SF_{bias}$, WORD and bit are LOW while $V_{dd}$-rst is HIGH. To release all unintentionally collected charge carriers, RESET is set to HIGH during the reset period. During the reset period, $SF_{bias}$, WORD and bit are LOW while $V_{dd}$-rst is HIGH. After the reset period, RESET is returned to LOW while the rest of the signals are maintained at their current state and the integration period begins. The integration period is analogous to the exposure time or the amount of time that light is collected and electron-hole pair are generated. In low light scenarios, there are fewer photons available so the integration time might be long, while conversely, in bright light scenarios there are more photons available, so the integration time might be short. After the integration period is complete, $SF_{bias}$ and WORD signals are set HIGH so as to read out the charge carriers collected by the photo-diode.

In one embodiment of the current invention it is advantageous to pulse the $SF_{bias}$ signal. By turning the $SF_{bias}$ on and off the random pixel noise it generates can be significantly reduced.

Figure 3:
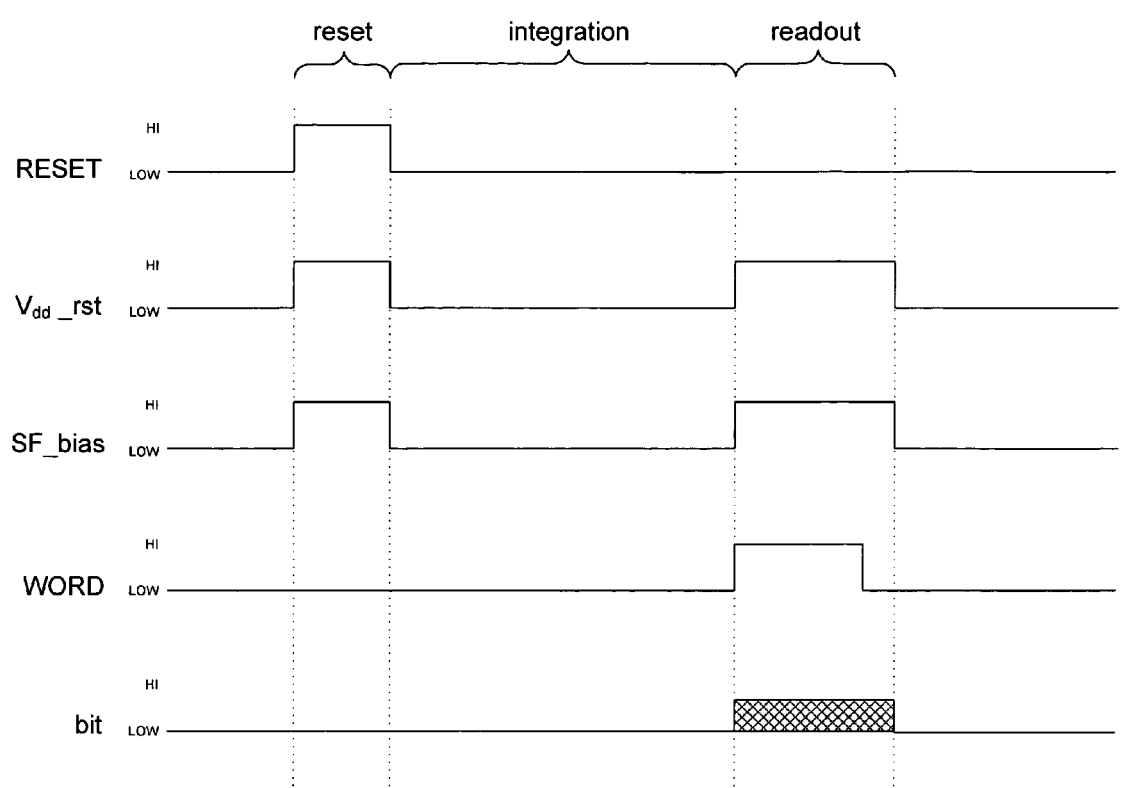
FIG. 3 is a timing diagram of the operation of a CMOS active pixel according to one embodiment of the current invention.

In one embodiment of the current invention $V_{dd}$-rst and $SF_{bias}$ are electrically coupled so that both signals are identical. When $SF_{bias}$ is set high, $V_{dd}$-rst is also set high and when $SF_{bias}$ is set low, $V_{dd}$-rst is also set low. The timing diagram for such a configuration is shown in FIG. 3.

Optionally, both $SF_{bias}$ and $V_{dd}$-rst can be pulsed together. This configuration has the advantage of increasing overall pixel sensitivity with lower complexity and cost of other embodiments.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

I claim:

1. A method for a CMOS active pixel comprising the steps of;
   providing for a photodiode comprising;
      a cathode; and,
      an anode;
   providing for a RESET transistor comprising;
      a source;
      a drain; and
      a gate;
   providing for an source follower transistor comprising;
      a source;
      a drain; and
      a gate;
   providing for a $V_{dd}$-rst signal to the source or drain of said reset transistor; and,
   providing for a $SF_{bias}$ signal to the source or drain of the said source follower transistor;
   holding said $V_{dd}$-rst signal at a high state at all times; and,
   controlling said $SF_{bias}$ signal during integration.

2. The method of claim 1 wherein the controlling step of said $SF_{bias}$ signal during integration comprises holding said $SF^{bias}$ signal at a low state.

3. The method of 2 further comprising the step of providing for one or more additional transistors.

4. The method of claim 1 wherein the controlling step of said $SF_{bias}$ signal during integration comprises pulsing said $SF_{bias}$ signal between a low and high state.

5. The method of 4 further comprising the step of providing for one or more additional transistors.

6. The method of claim 4 wherein the controlling step of said $V_{dd}$-rst and $SF_{bias}$ signals during integration comprises holding said $V_{dd}$-rst and $SF_{bias}$ signals at a low state.

7. The method of claim 5 further comprising the step of providing for one or more additional transistors.

8. The method of claim 4 wherein the controlling step of said $V_{dd}$-rst and $SF_{bias}$ signals during integration comprises pulsing said $V_{dd}$-rst and $SF_{bias}$ signals between a low and high state.

9. The method of claim 6 further comprising the step of providing for one or more additional transistors.

\* \* \* \* \*